United States Patent
Chung et al.

(12)

(10) Patent No.: US 8,443,721 B2
(45) Date of Patent: May 21, 2013

(54) FOOD PRODUCT STEAMER

(75) Inventors: Terry Tae-Il Chung, Bartlett, IL (US);
Loren Veltrop, Chicago, IL (US);
Wieslaw Tomczyk, Wheeling, IL (US);
Donald Van Erden, Grayslake, IL (US);
Jack Guasta, Glendale Heights, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 444 days.

(21) Appl. No.: 12/683,986

(22) Filed: Jan. 7, 2010
(Under 37 CFR 1.47)

(65) Prior Publication Data
US 2011/0162537 A1 Jul. 7, 2011

(51) Int. Cl.
*A47J 27/04* (2006.01)
*A47J 37/12* (2006.01)

(52) U.S. Cl.
USPC .............................. 99/467; 99/483; 219/404

(58) Field of Classification Search
USPC ................... 99/456, 467, 473, 474, 477, 478, 99/483; 219/404
See application file for complete search history.

(56) References Cited

U.S. PATENT DOCUMENTS

| | | | |
|---|---|---|---|
| 3,010,383 A * | 11/1961 | Greene | 99/332 |
| 4,291,617 A | 9/1981 | Miller et al. | |
| 4,452,132 A | 6/1984 | Miller et al. | |
| D279,854 S | 7/1985 | Miller et al. | |
| 4,617,908 A | 10/1986 | Miller et al. | |
| 6,909,070 B2 | 6/2005 | Veltrop | |
| 6,996,334 B1 | 2/2006 | Parsons et al. | |
| 7,222,563 B2 | 5/2007 | Reckert et al. | |
| 7,274,003 B2 * | 9/2007 | Baumann | 219/401 |
| 7,328,654 B2 | 2/2008 | Shei | |
| 2011/0250336 A1 * | 10/2011 | Ewald et al. | 426/511 |

* cited by examiner

*Primary Examiner* — William Pierce
(74) *Attorney, Agent, or Firm* — Ryndak & Suri LLP (57) ABSTRACT

A food product steamer includes rotatable platforms that can be covered and uncovered by one or more rotatable, concave hoods. In a first position for the platform(s), the platform(s) supports a food product over a steam-emitting opening above a steam generator. In a first position for the hood, the hood covers the food product such that steam from the steam generator is trapped within the hood to steam the food product. In a second, open position, the hood is rotated where it can receive the food product when the food product slides or falls off the platform as the platform is rotated from its first position to a second, elevated position. At least one embodiment enables food products to be removed from either side of the steam generating base by using a double-acting hinge.

18 Claims, 14 Drawing Sheets

FOOD PRODUCT STEAMER

FIELD OF THE INVENTION

This invention generally relates to food steamers. More particularly, this invention relates to a steamer for food products that include sandwich buns, rolls, croissants and bagels, as well as pastas, vegetables and other food products.

BACKGROUND OF THE INVENTION

Steamers are used in the food service industry to treat bread and bread-type products prior to being served. When steam impregnates a bread-type food product, such as a sandwich roll, the steam tends to soften the bread product making the bread product seem fresher.

Steamers include both boiler-type steamers as well as flash steamers in which a volume of water is deposited or sprayed onto a hot surface, which "flashes" or converts the water to steam. A small, fixed amount of water is delivered onto a hot, dry surface which causes the water to be quickly boiled off and turned into steam.

A problem with prior art steamers is the removal of a food product after it has been steamed or cooked. Since many restaurants sell food products in specialized packages, it would be advantageous for a food product steamer to be able to steam a food product as well as dispense or serve the food product into a package in which the food product will be sold.

DETAILED DESCRIPTION

Figure 1:
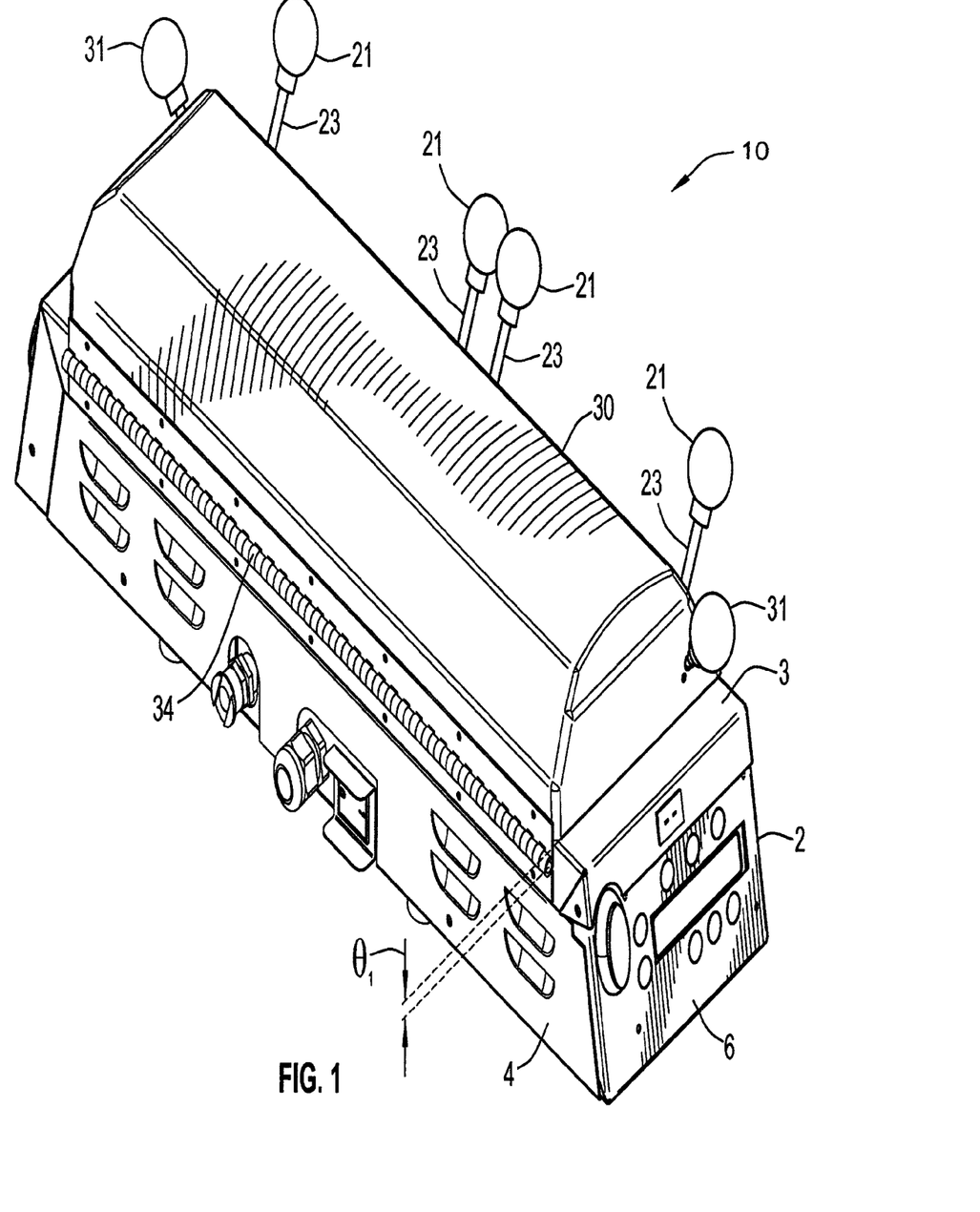
FIG. 1 is a perspective view of a food product steamer.

FIG. 1 depicts the shape and appearance of a preferred embodiment of a food product steamer 10. FIG. 1 also shows that the steamer 10 is comprised of a steam-trapping hood 30 and a steam-generating/steam-emitting base 2.

The hood 30 has a shape reminiscent of a Quonset in the sense that the hood 30 has a somewhat arching roof-shape. The base 2 has a shape reminiscent of a rectangular parallelepiped.

The base 2 has a control panel with a display and controls for electronic devices inside the base, such as a timer and water controls. The display and the controls, which are operable by a user, comprise a user interface for the steamer.

The base 2 has a substantially planar top face or surface 3, a left sidewall 4, right sidewall 5, a front end wall 6 and a rear wall 7. The two sidewalls 4 and 5 are provided with air vents as shown. Not visible in FIG. 1 is an opening 14 in the top side 3 through which steam is emitted from the surface of a steam-generating platen, such as the one disclosed in the Applicant's co-pending patent application entitled, Food Product Steamer, filed on Oct. 10, 2008, and which is identified by U.S. patent application Ser. No. 12/249,125. The contents of patent application Ser. No. 12/249,125 are incorporated herein by reference.

As shown in patent application Ser. No. 12/249,125 and as can be seen in the exploded view shown in FIG. 4, the opening 14 in the top side 3 of the steamer 10 is covered by a steam-trapping hood 30. Steam that is trapped within the hood can be used to freshen bread products such as sandwich rolls and breads. The steam can also be used to cook foods, such as vegetables and pasta.

An elongated continuous hinge 34, also known as a piano hinge 34, rotatably connects the hood 30 to the base 2. In the embodiment shown, the hinge 34 is attached to the left side 4 of the base 2 and just below the top surface 3. A handle 31 attached to the hood 30 through a stem 32 allows an operator to rotate the hood counterclockwise (when viewed from the front panel 6) to open the hood 30.

When the hood 30 is in its closed position, as shown in FIG. 1, the bottom of the hood 30 and the top surface 3 of the base 2 are substantially co-planar. Stated another way, the angle $\theta_1$ defined by the bottom surface of the hood 30 and the top surface 3 of the base 2, as measured around a geometric axis defined by the pivot of the piano hinge 34 is zero degrees or nearly zero degrees.

Figure 2:
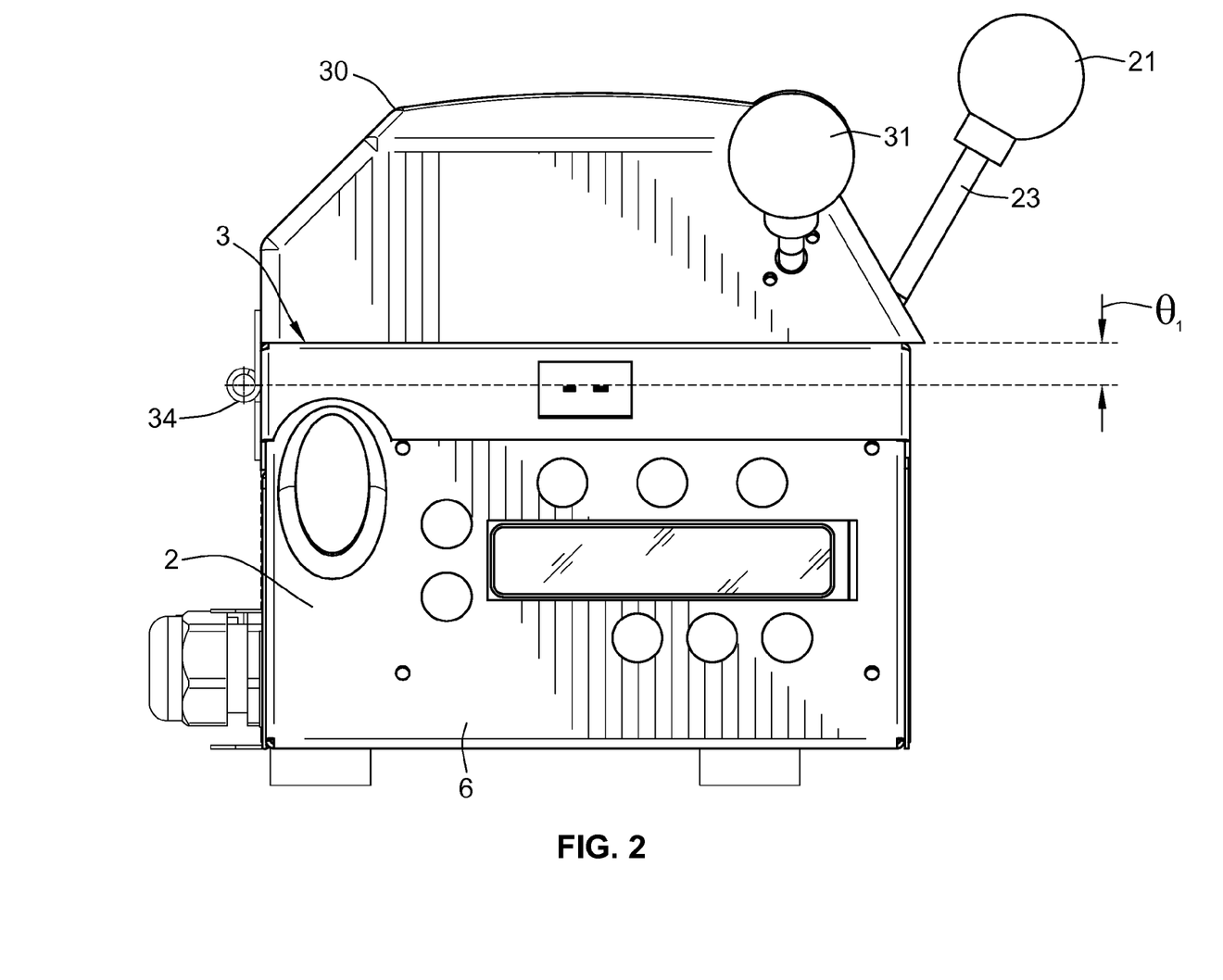
FIG. 2 is a front view of the food product steamer shown in FIG. 1.
Figure 3:
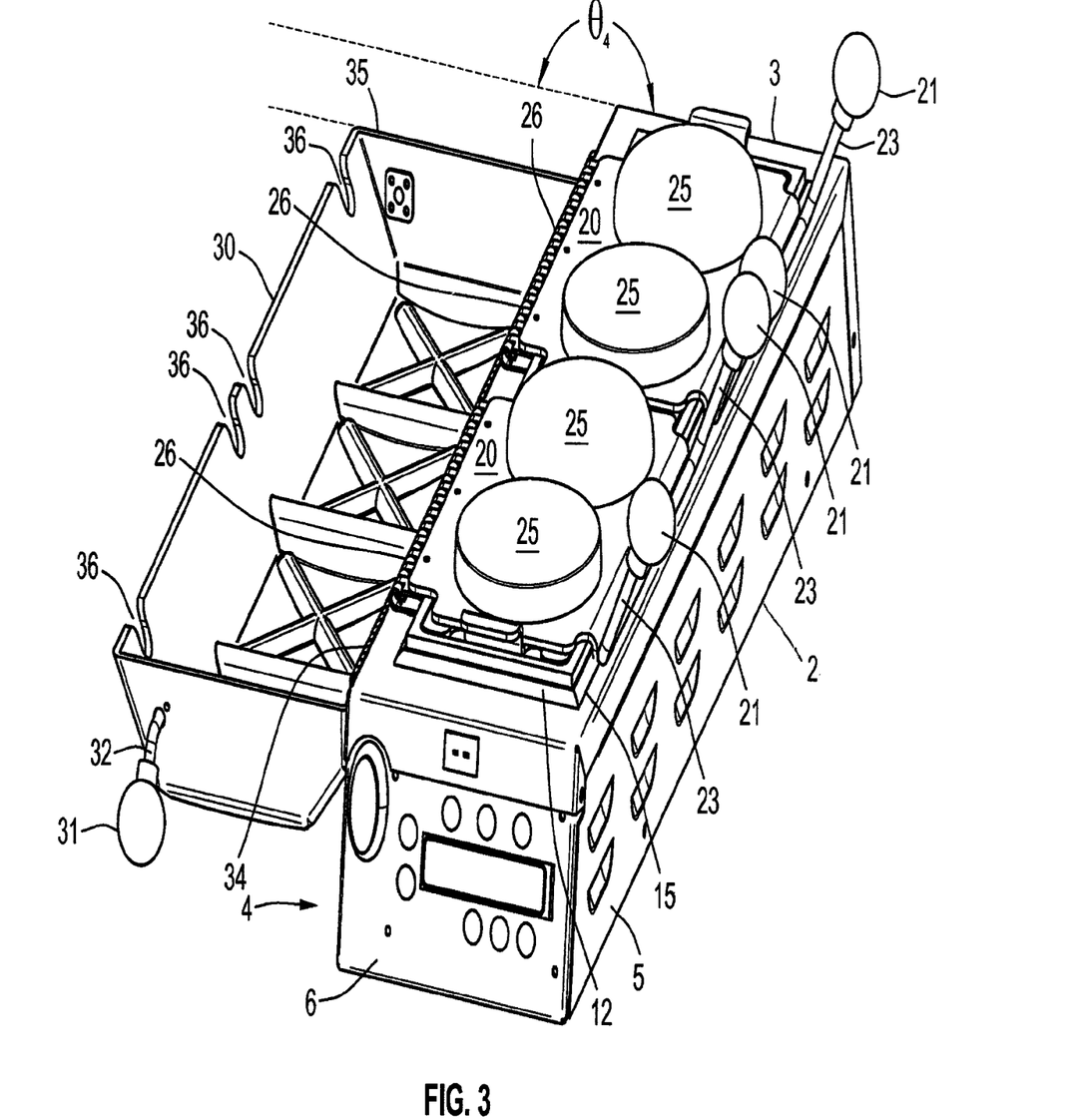
FIG. 3 is a perspective view of the food product steamer shown in FIG. 1 with the hood opened.

FIG. 2 is a front view of the steamer 10 shown in FIG. 1. The angle $\theta_1$ between the hood 30 and the top surface 3 of the base 2 is more clearly visible in FIG. 2 in that, the top surface 3 of the base 2 and the bottom face or edge of the hood 30 are contiguous. As shown in the figure, the angle formed between the bottom edge or surface of the hood and the top 3 of the base 2 is identified in the figure by $\theta_1$ FIG. 3 is a different perspective view of the food product steamer 10. In FIG. 3, the hood 30 is shown in its full-open position. A geometric plane defined by the edges 35 of the hood 30, is substantially parallel to a geometric plane defined by the top side 3 of the base 2. A second, larger angle identified as $\theta_4$ exists between the plane defined by the bottom edges 35 of the hood 30 and the plane defined by the top surface 3 of the base 2. As the figure shows, $\theta_4$ is substantially equal to 180°. Those of ordinary skill will recognize that when the hood 30 is closed, $\theta_1$ is zero or nearly zero. When the hood 30 is fully open, the second angle $\theta_4$ is much larger, typically 180 degrees or nearly 180 degrees.

In FIG. 3, food products 25 embodied as bread rolls are shown resting on top of relatively thin, planar and substantially rectangular-shaped food product support platforms which are identified by reference numeral 20. The platforms 20 are perforated with several holes 24, shown in FIG. 4. The holes 24 are sized, shaped and arranged to allow steam to pass through them. The holes 24 in the platforms 20 are thus considered herein to be "steam-passing" holes.

A side edge of each food product platform 20 is attached to a hinge 26, which is in turn attached to the base 2 at the top surface 3 thereof. The axes of the hinges 26 define geometric axes around which the food product platforms 20 rotate when the platforms 20 are lifted using one of the handles 21, which are attached to the platforms by stems 23. As shown in FIG. 3, the food product platforms 20 rest at a position such that the angle $\theta$ between the food product platform 20 and the top side 3 of the base 2 is substantially equal to 0°. As shown in FIG. 3, the food product platforms 20 are horizontal or substantially horizontal and located above the steam generating basin 12 from which steam is emitted.

As stated above, the platforms 20 can be rotated about the hinge 26 by an operator lifting a handle 21 attached to the platform 20 through a stem 23. In the embodiment shown, rotating the platform 20 counterclockwise around the axis defined by the hinge 26 lifts the food products 25 around the axis to a point where the food product 25 will eventually slide off or fall off the food product platform 20 due to gravity acting on the food product 25.

Figure 4:
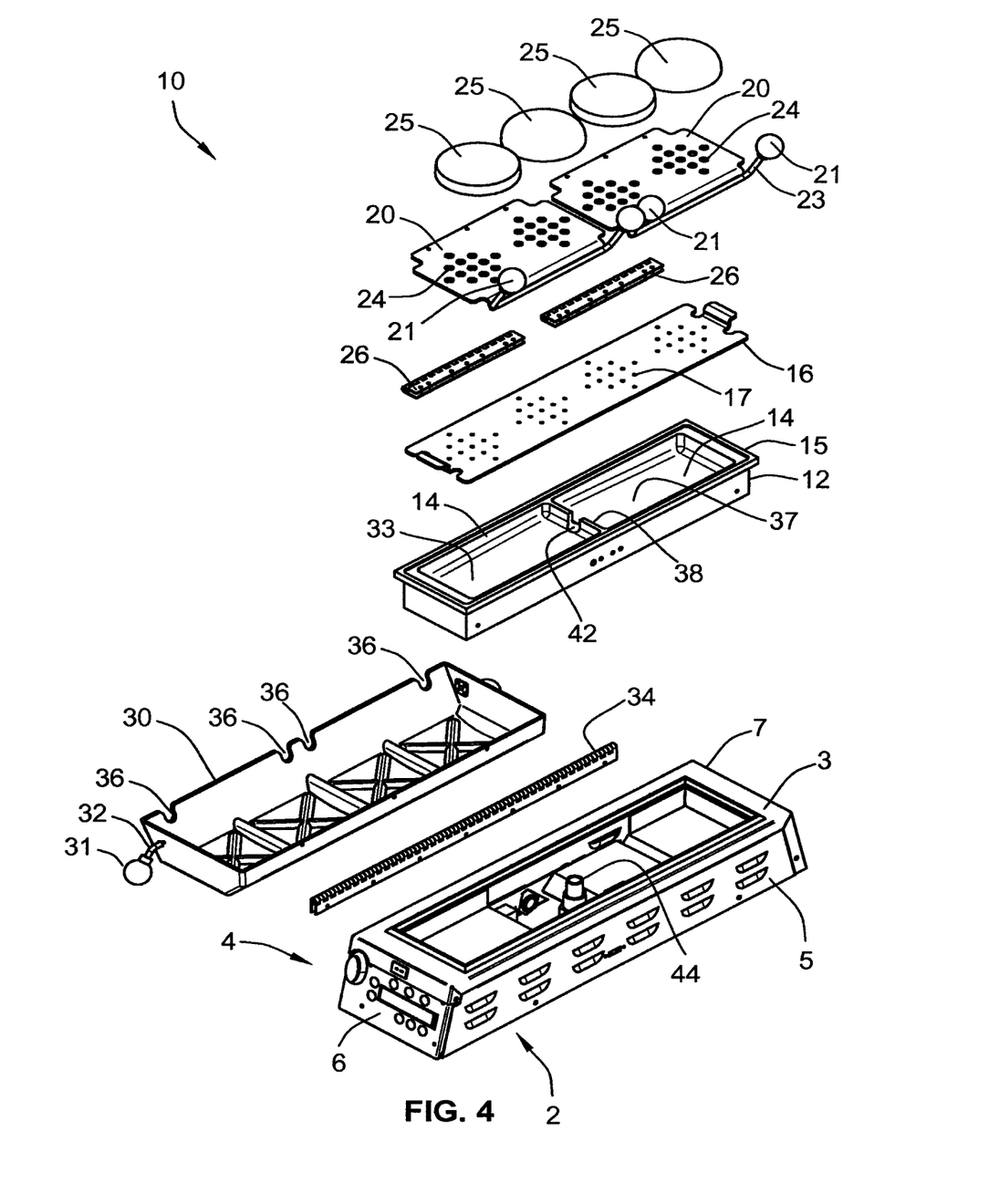
FIG. 4 is an exploded view of the food product steamer shown in FIG. 3.

FIG. 4 is an exploded view of the food product steamer shown in FIGS. 1-3. The base 2 can clearly be seen to have a top surface 3, left sidewall 4, right sidewall 5, a front end wall 6 and a rear end wall 7. An elongated "piano" hinge 34 for the hood 30 is attached to the left sidewall 4 and to the hood 30 to allow the hood 30 to rotate about the axis defined by the hinge 34. Rotating the hood clockwise around the hinge 34 lowers the concave-shaped portion of the hood over a food product 25 resting on a platform 20. Steam is generated by water that flows onto the inclined heated surfaces 33 and 37 of the basin/heated platen 12 through a hole 42 in the apex 38 of the two inclined surfaces 33, 37. The water is provided to the basin/heated platen 12 by a water conduit 44 that extends upwardly through the base 2 and supplied by a source not shown in the figure.

As used herein, the open top of the basin 12 is considered to be an opening 14 from which steam is emitted. Steam that is generated over the heated surfaces 33 and 37 passes through a venturi plate 16, which like the platform 20, is provided with numerous, steam-passing small holes 17. The holes 17 in the venturi plate 16 are also considered to be steam-passing holes or openings through which steam is emitted.

The basin 12 shown in FIG. 4, is substantially rectangular. An exterior rim 15 of the basin 12 is considered herein to define a limit of the opening 14. Stated another way, the rim 15 defines where the opening 14 begins and ends. The space or area inside the rim 15 is therefore considered to be an opening from which steam is emitted.

Figure 5:
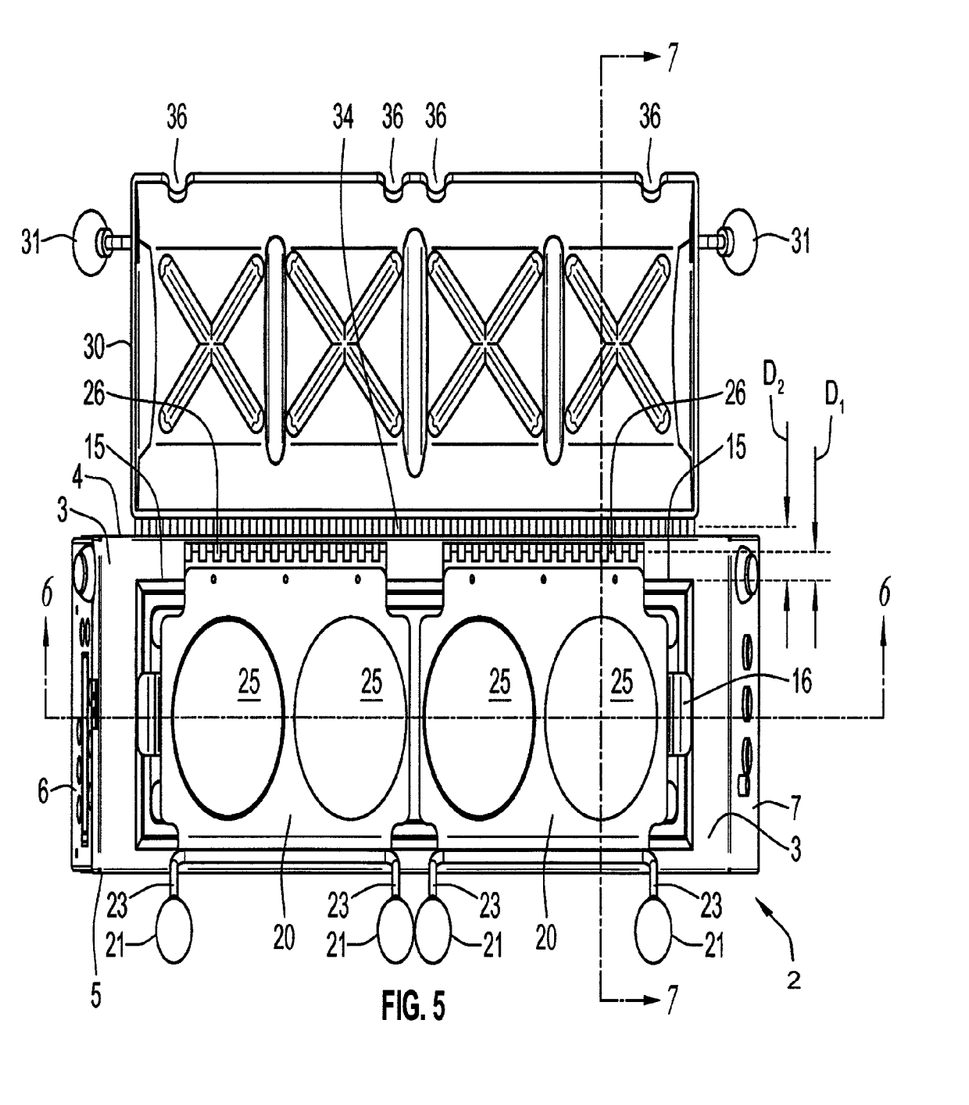
FIG. 5 is a top view of the food product steamer.

FIG. 5 is a top view of the food product steamer 10 shown in FIGS. 1-4. The hinge 34 to which the hood 30 is attached, is itself attached to the left side wall 4 of the base 2 through the aforementioned hinge 34. The hinges 26 that attach the platforms 20 to the base 2 are themselves attached to the top surface 3 of the base 2. As can be seen in FIG. 5 as well as FIG. 3, notches 36 formed in the hood 30 allow the hood 30 to close over the stems 23 by which the handles 21 for the platforms 20 are attached to the platforms 20.

As described above, a geometric axis about which the platform 20 rotates is defined by the hinges 26. In FIG. 5, the hinges 26 and its corresponding axes are separated from the edge 15 of the basin 12, i.e., from the opening from which steam is produced, by a first distance identified in the figure by D1. The hinge 34 for the hood 30 is attached to the left sidewall 4 of the base 2, such that the axis defined by the hood hinge 34 is separated from the lip or edge 15, and hence the opening from steam is emitted, by a greater distance identified as D2.

Figure 6:
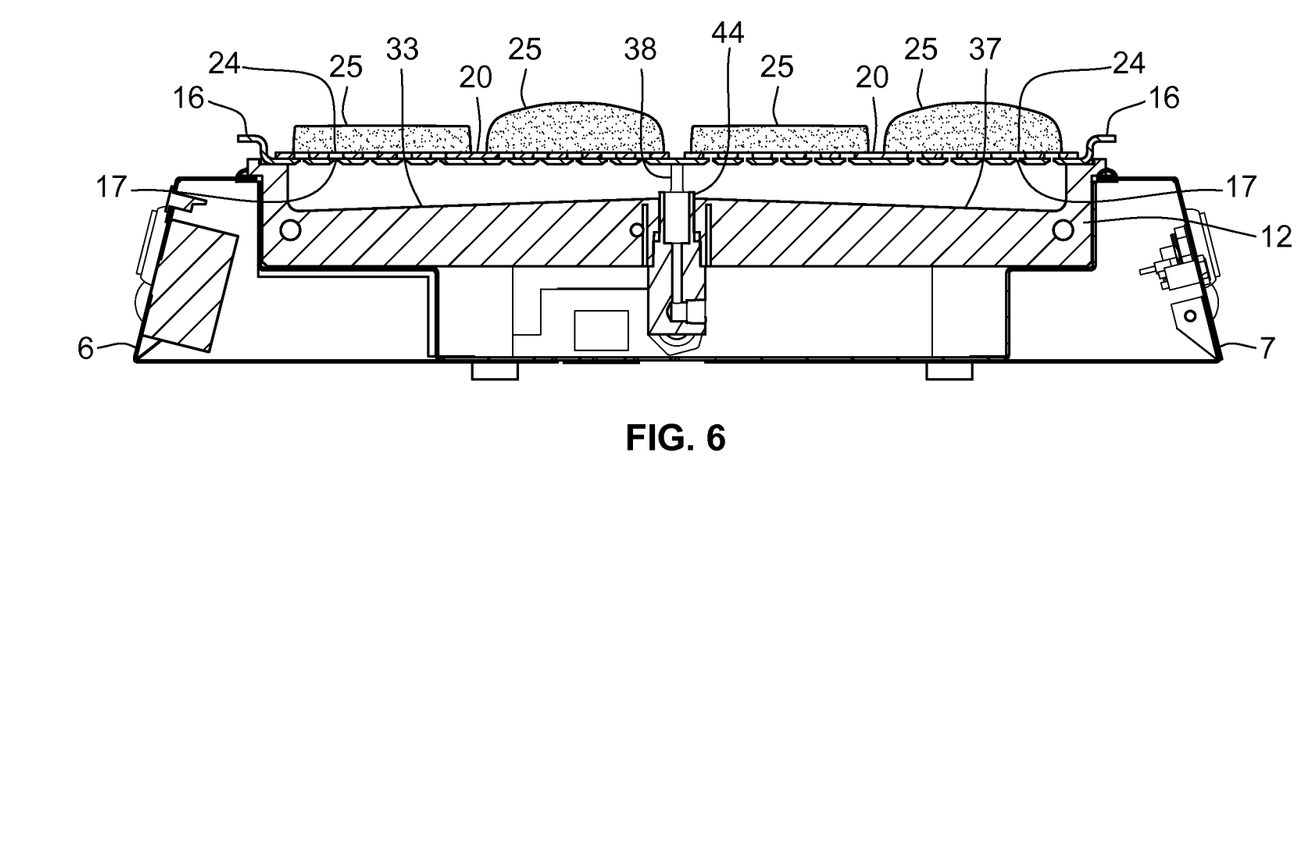
FIG. 6 is a side, cross-sectional view.

FIG. 6 is a cross-sectional view of the steamer 10 shown in FIG. 5, taken through lines 6-6 of FIG. 5. It can be seen that water dispensed onto the heated surfaces 33 and 37 through a port 44 flows from the apex 38 downwardly, boiling off as it runs over the heated surfaces 33 and 37. Water that is thus flashed into steam passes through holes 17 in the venturi plate 16, through the steam-passing holes 24 in the platforms 20 and into a bread product or other food product on the platforms 20.

Figure 7:
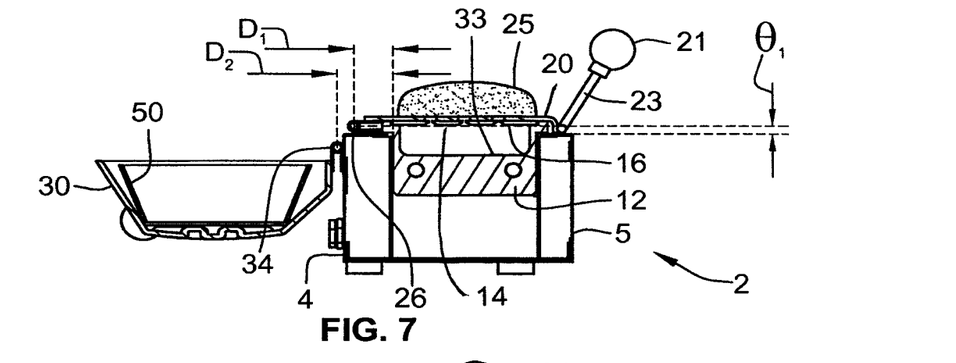
FIG. 7 is an end, cross section view.

FIG. 7 is a cross-sectional view of the steamer 10 shown in FIG. 5 taken through section lines 7-7. The different separation distances of the hinges 26 and 34 from the opening 14 in the top 3 and which is defined by the edge 15, are more clearly visible in FIG. 7. The first separation distance D1 of the platform hinges 26 from the edge 15 is clearly seen to be less than the second separation distance D2, D2 being the separation distance of the second hinge 34 from the edge 15.

Figure 8:
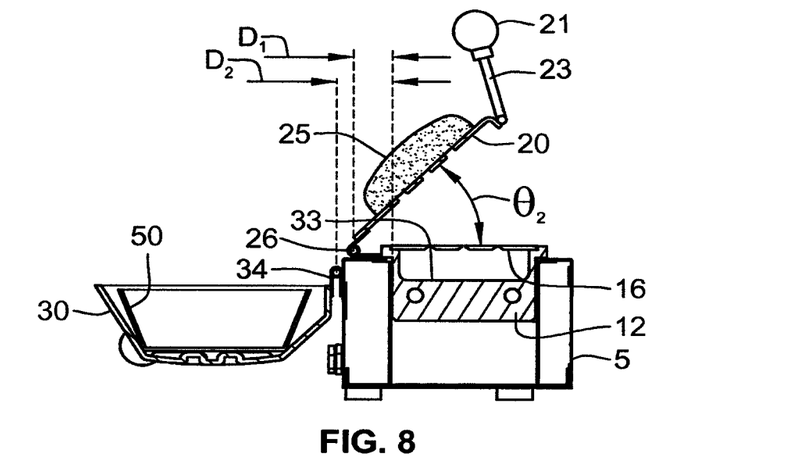
FIG. 8, is an end, cross section view.
Figure 9:
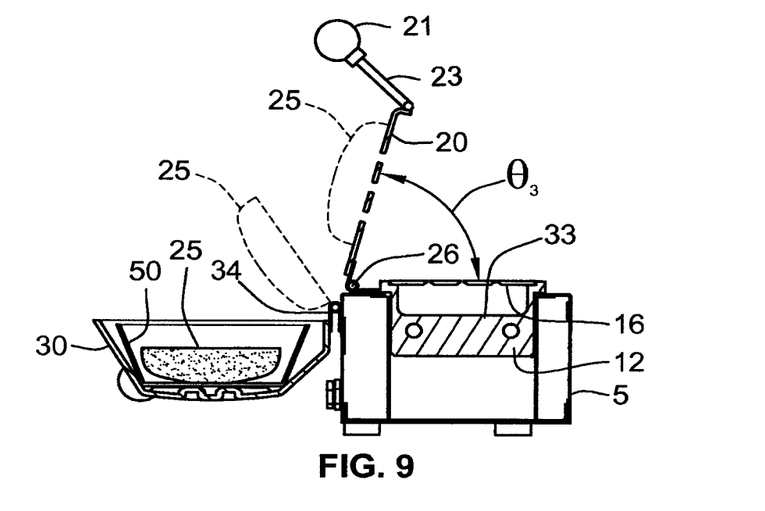
FIG. 9, is an end, cross section view.

In FIG. 7, the food product support platform 20 is shown at a resting angle position $\theta_1$ where it supports a food product 25 over the venturi plate 16 and the opening 14 in the basin 12. FIG. 8 shows the platform 20 rotated in a counterclockwise direction to a second angle identified as $\theta_2$. As the inclination angle increases toward $\theta_3$ as shown in FIG. 9, the food product 25 on the platform eventually falls or slides off the platform and into the concave space defined by the hood 30, which is rotated to its full open position. In order to facilitate food product removal, the surface of the platform 20 is highly polished.

Collectively, FIGS. 7, 8 and 9 show that when the steam-trapping hood 30 is rotated from a closed position where it covers a food product 25 on the platforms 20, to an open position, such as the one shown in FIG. 7, a food product 25 on the platform 20 can thereafter be rotated on the platform 20 and "dropped" into the hood 30 or a package 50 for the food product, such as a point-of-sale package 50, simply by lifting the platform 20 by its handle 21.

Figure 10A:
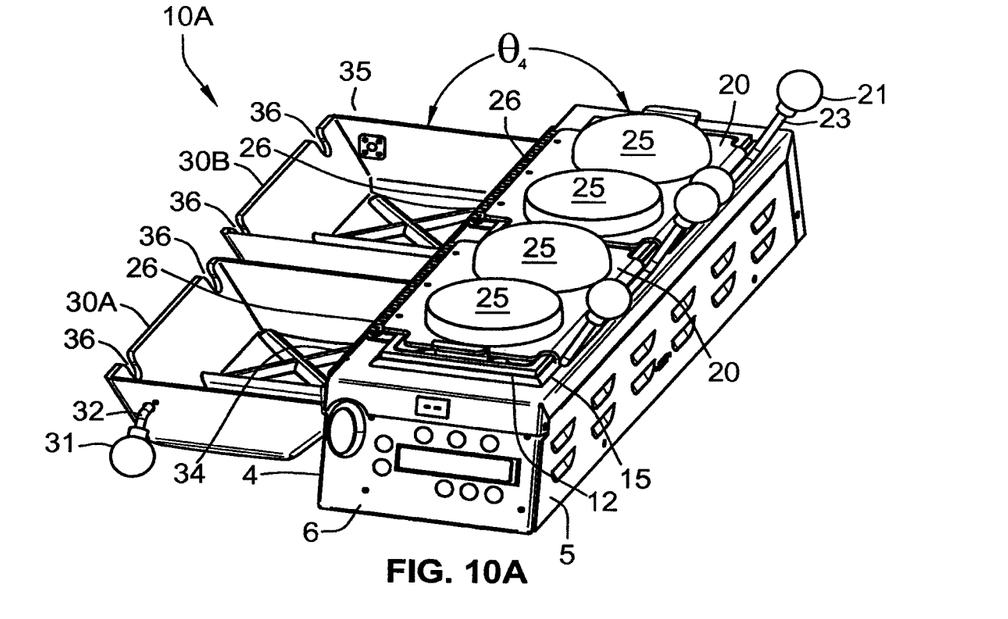
FIG. 10A is a perspective view of a first alternate embodiment.
Figure 10B:
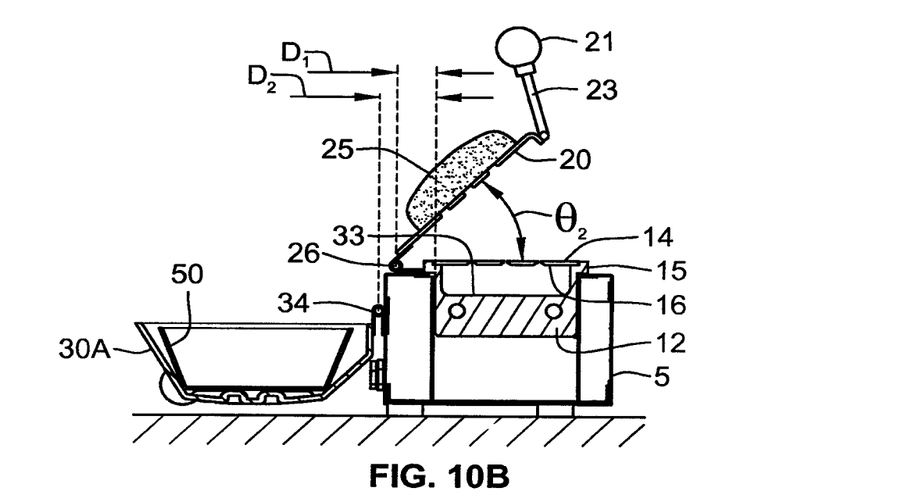
FIG. 10B is a cross sectional view of the alternate embodiment shown in FIG. 10A.

FIGS. 10A and 10B depict a first alternate embodiment of the steamer 10. The steamer 10A shown in FIGS. 10A and 10B differs from the steamer 10 shown in FIGS. 1-8 in that the single hood 30 shown in FIGS. 1-8 is replaced with two separate and individually operable hoods 30A and 30B. As with the single hood 30, each hood 30A and 30B is formed with notches 36 that allow the hoods to rotate to a clockwise position and close relatively tightly over the food product 25 and the platforms 20 on which they rest.

As with the embodiment shown in FIGS. 1-8, the embodiment shown in FIGS. 10A and 10B also permits the rotation of a support platform 20 from a first acute angle that is equal to or nearly equal to 0° to a second larger angle 32 at which a food product 25 will slide off or drop off the platform into a hood or a point of sale carton.

As with the first embodiment, FIG. 10B shows that the hinge 26 for the platform 20 is separated from the edge 15 of the opening 14 in the basin 12 by a first distance identified as D1. The hood hinge 34, which is attached to the left side 4 of the base 2 is separated from the edge 15 by a greater distance identified as D2 of the opening.

Figure 11A:
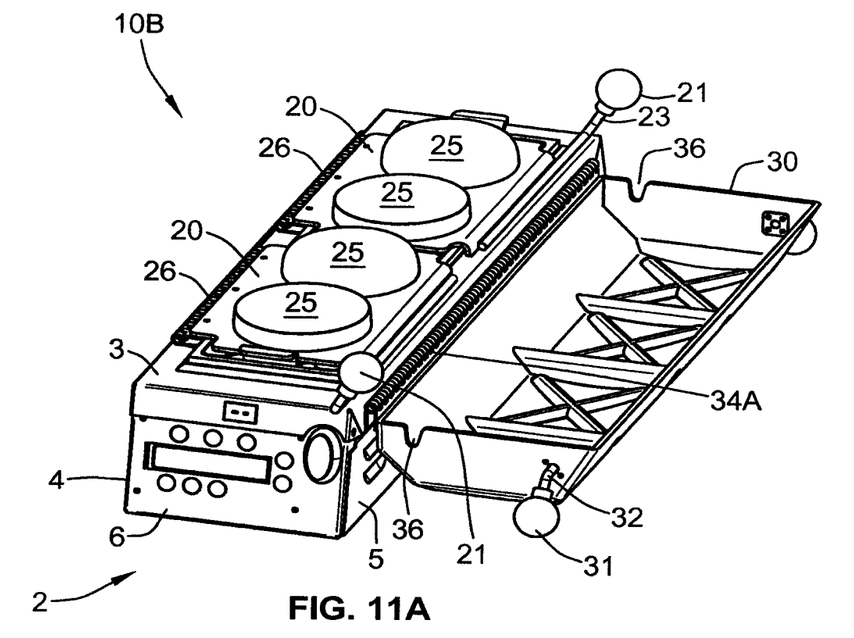
FIG. 11A is a perspective view of a second alternate embodiment.
Figure 11B:
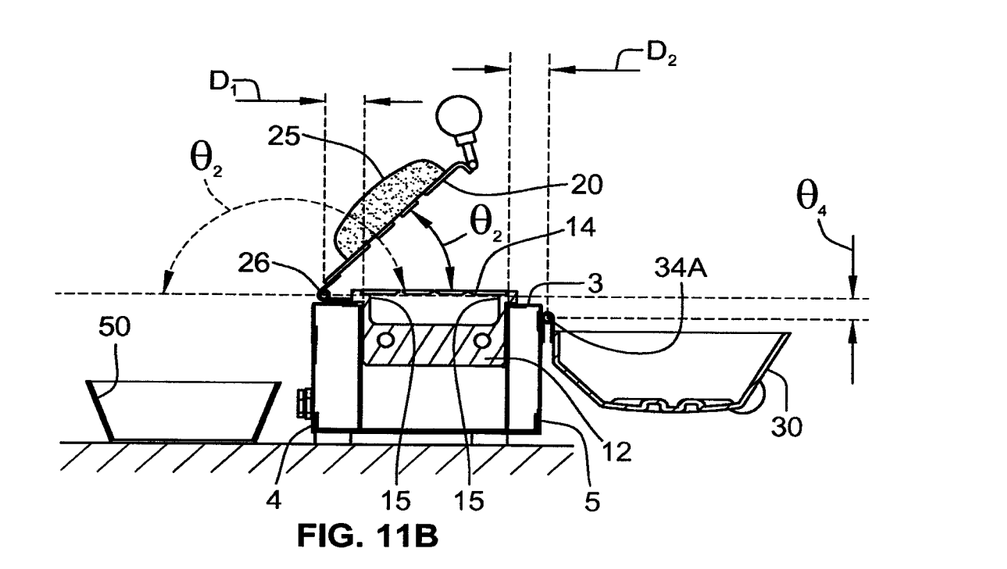
FIG. 11B is a cross sectional view of the alternate embodiment shown in FIG. 11A.

FIGS. 11A and 11B depict a third embodiment of a food product steamer 10B. In this embodiment, a single hood 30 is attached to the right side 5 of the base 2 through a piano hinge identified by reference numeral 34A. As with the embodiments described in FIGS. 1-9B, the platforms 20 are attached to the top surface 3 of the base 2 with the hinges 26 adjacent or approximate to the left side 4.

The third embodiment shown in FIGS. 11A and 11B differs from the other embodiments in that rotation of the platform 20 around the axis defined by the hinges 26 drops the food product 25 into a package 50 resting on the surface on which the steamer itself rests. In FIGS. 11A and 11B, the hood 30 rotates clockwise from its closed position to its open position.

Note that in the embodiment shown in FIGS. 11A and 11B, the separation distance between the platform hinge 26 and the edge 15 of the opening 14 is identified as D1. The separation distance between the edge 15 of the opening 14 and the piano hinge 34A for the hood 30 is identified as D2. Since the piano hinge 34A is attached to the right side whereas the platform hinge 26 is attached inside the left side 4, D2 is greater than D1 in FIG. 10B. Since the hinges are on opposite sides of the opening 14 defined by the edge 15 of the basin 12, in an alternate embodiment of that shown in FIGS. 11A and 11B, D2 could also be less than or equal to D1.

Figure 12A:
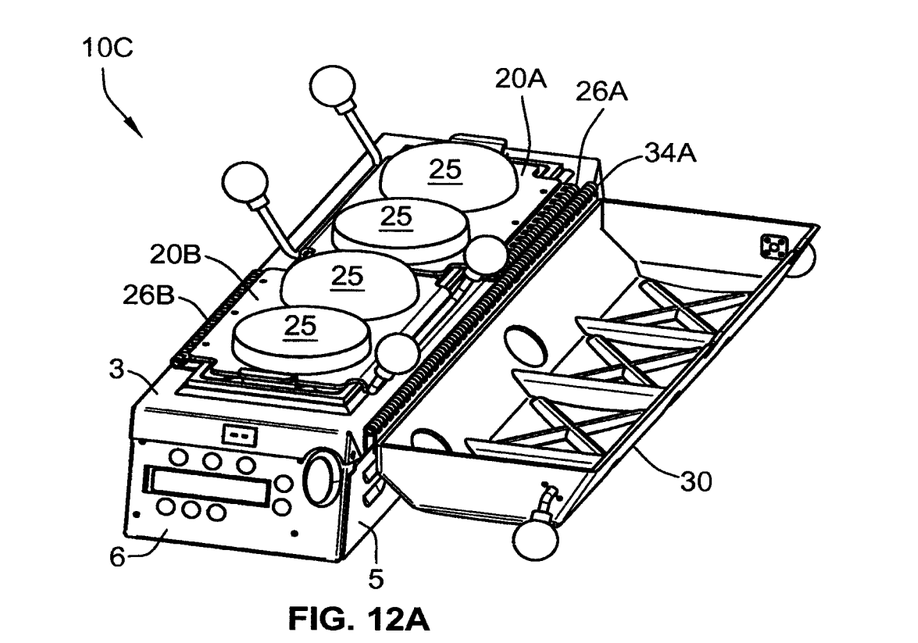
FIG. 12A is a perspective view of a third alternate embodiment.
Figure 12B:
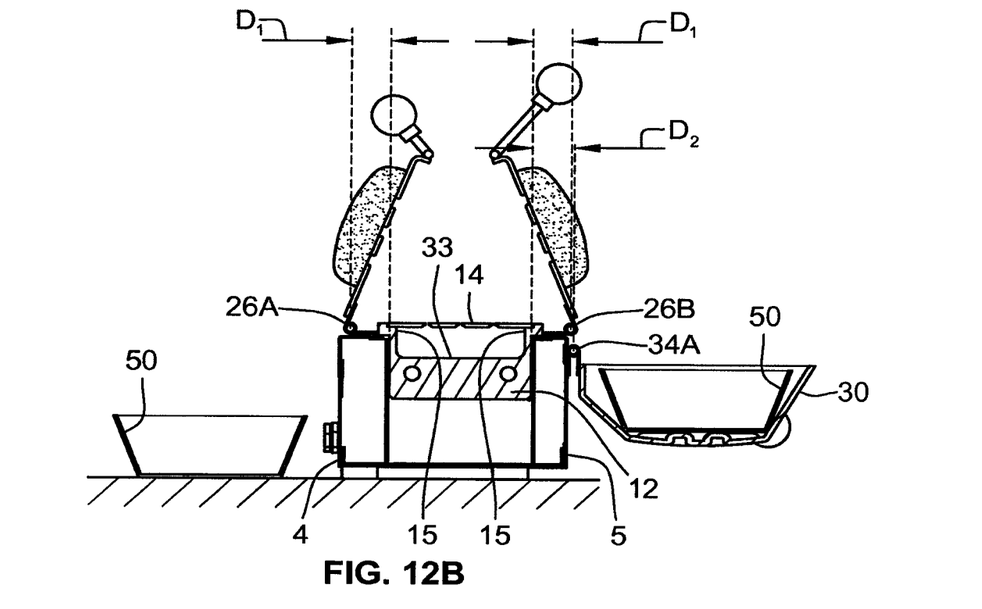
FIG. 12B is a cross sectional view of the alternate embodiment shown in FIG. 12A.

FIGS. 12A and 12B depict yet another embodiment of a food product steamer 10C. In this figure, the piano hinge 34A for the hood 30 is attached to the right side 5 as with the embodiment shown in FIGS. 11A and 11B. In FIGS. 12A and 12B, however, the platforms 20A and 20B rotate clockwise and counterclockwise respectively around corresponding piano hinges 26A and 26B.

As can be seen in FIG. 12B, the separation distances D1 of the hinges 26A and 26B from the edge 15 of the opening 14, are substantially the same. In an alternate embodiment, however, the separation distances of the hinges 26A and 26B from the edge 15 can be different.

The separation distance D2 of the hinge 34A for the hood is greater than D1 owing to the fact that the hinge 34A is attached to the right sidewall 5. In an alternate embodiment, the hinge 34A could also be attached to the top surface 3, on the right-hand side of the opening 14.

Figure 13:
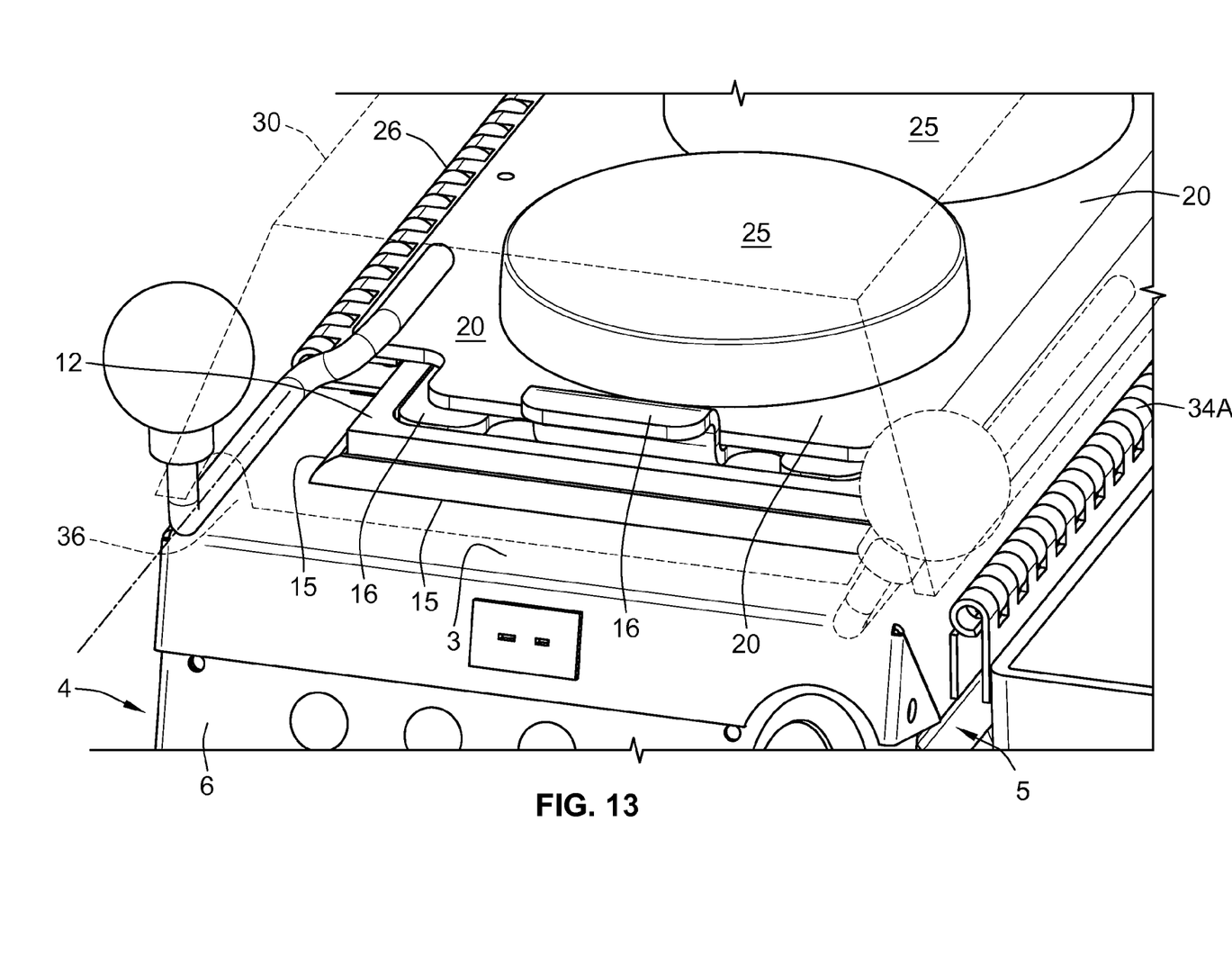
FIG. 13 is an isolated view of a food product steamer, showing placement of hinges relative to the opening 15.

FIG. 13 is a close-up view of the steamers shown in FIGS. 11A through 12B. This figure shows the spacing and location of the hinges 26 relative to the edge 15. The venturi plate 16 can also be seen to be just inside the edge 15 of the basin 12.

Figure 14:
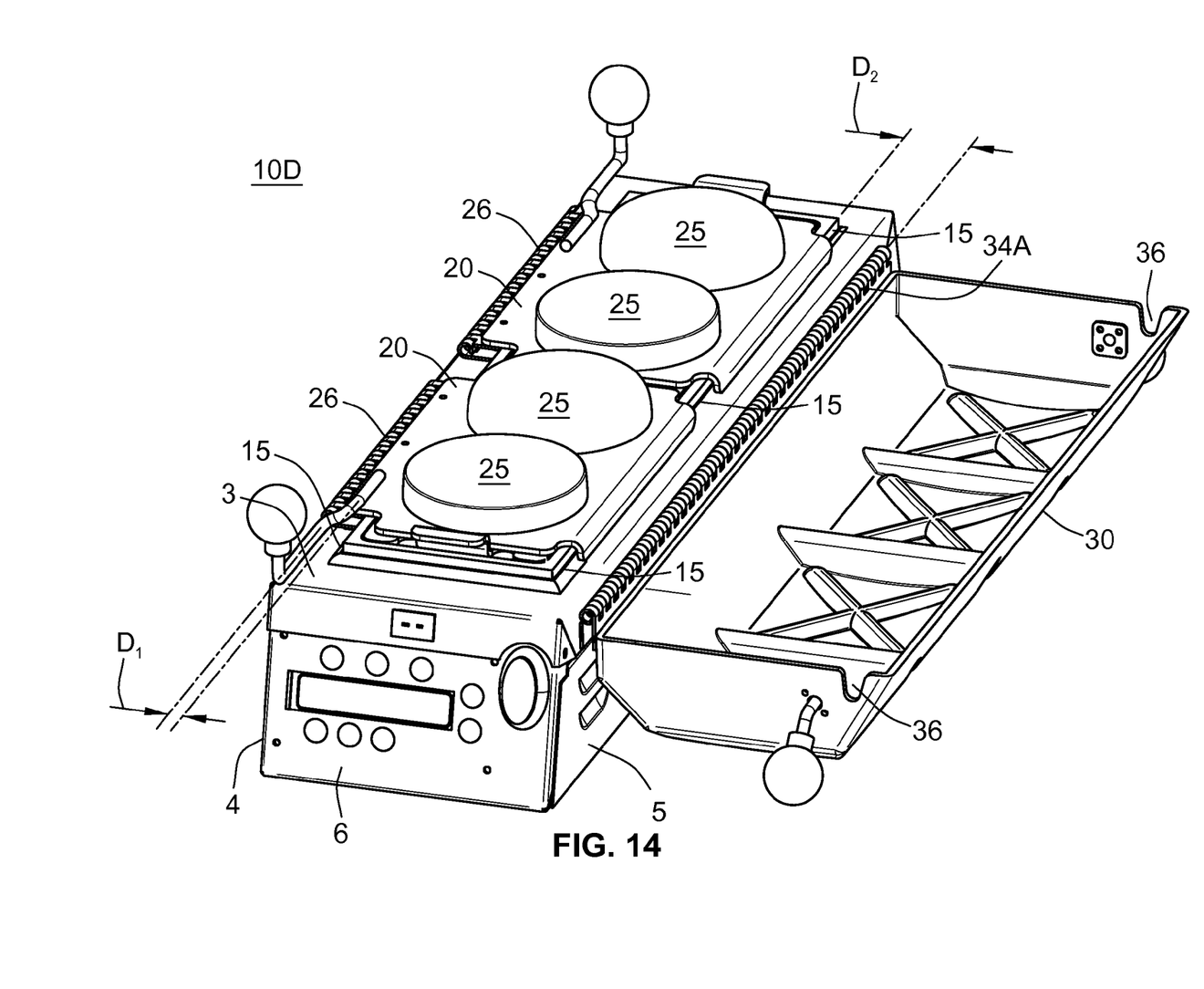
FIG. 14 is a perspective view of a fourth alternate embodiment.

FIG. 14 is another perspective view of yet another alternative embodiment of a steamer 10D. FIG. 14 also shows dimension lines extending from the axes of the various hinges and the determination of the corresponding separation distances D1 and D2.

Figure 15A:
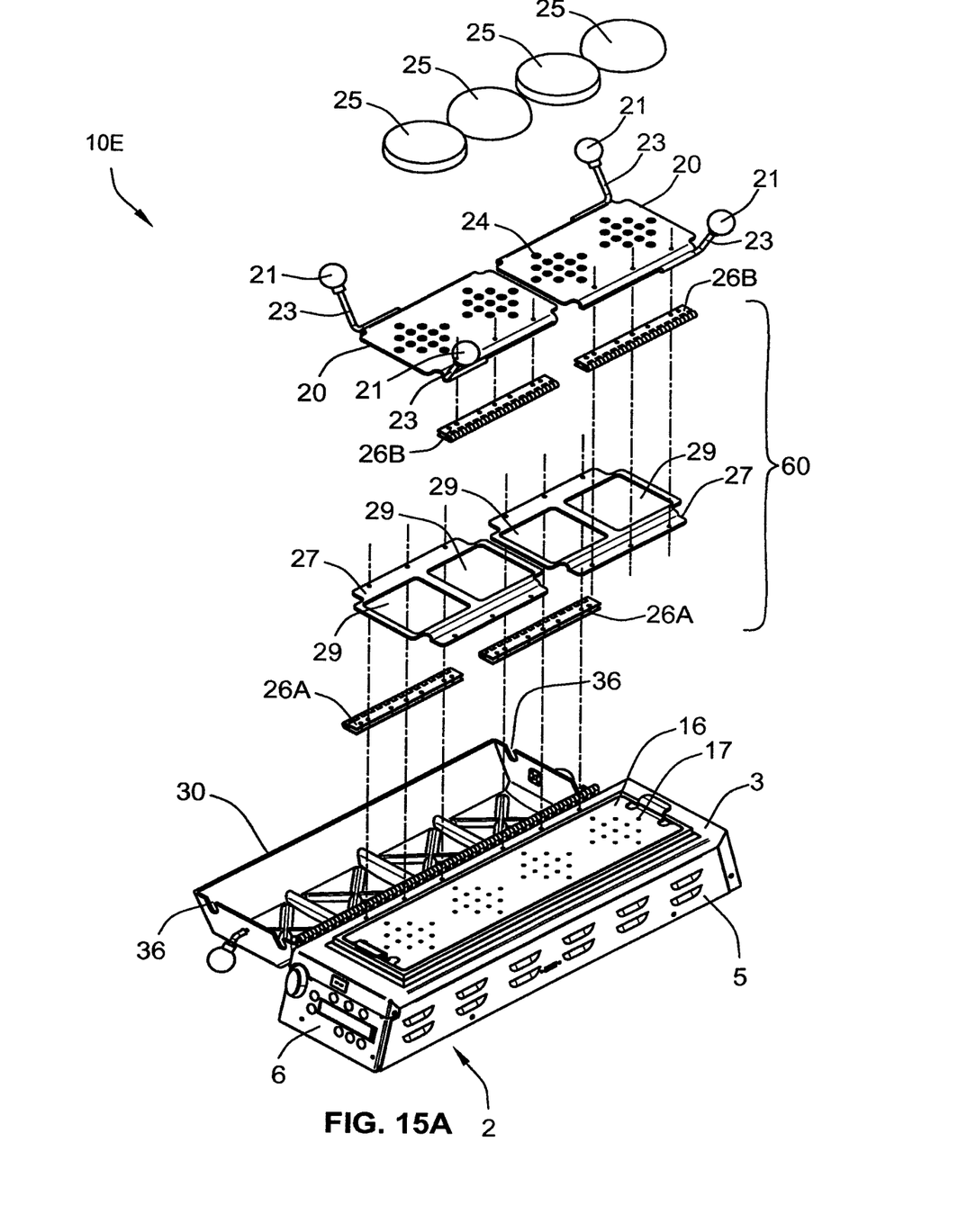
FIG. 15A is an exploded view of another alternate embodiment wherein the food product platform can rotate in two directions.
Figure 15B:
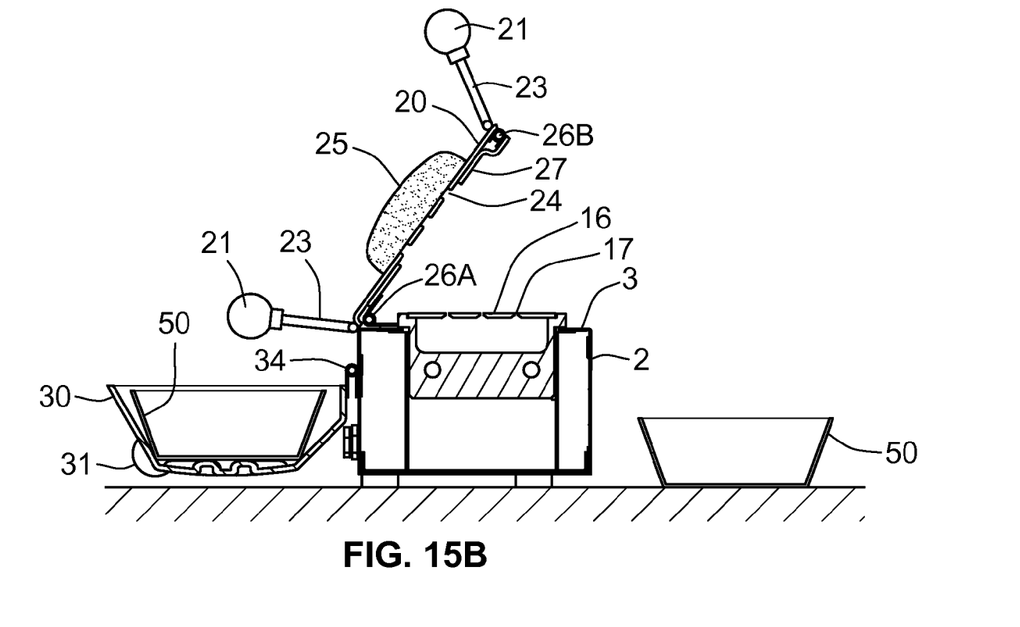
FIG. 15B is a cross-sectional front view of the embodiment shown in FIG. 15A showing the food product platform rotated counterclockwise.
Figure 15C:
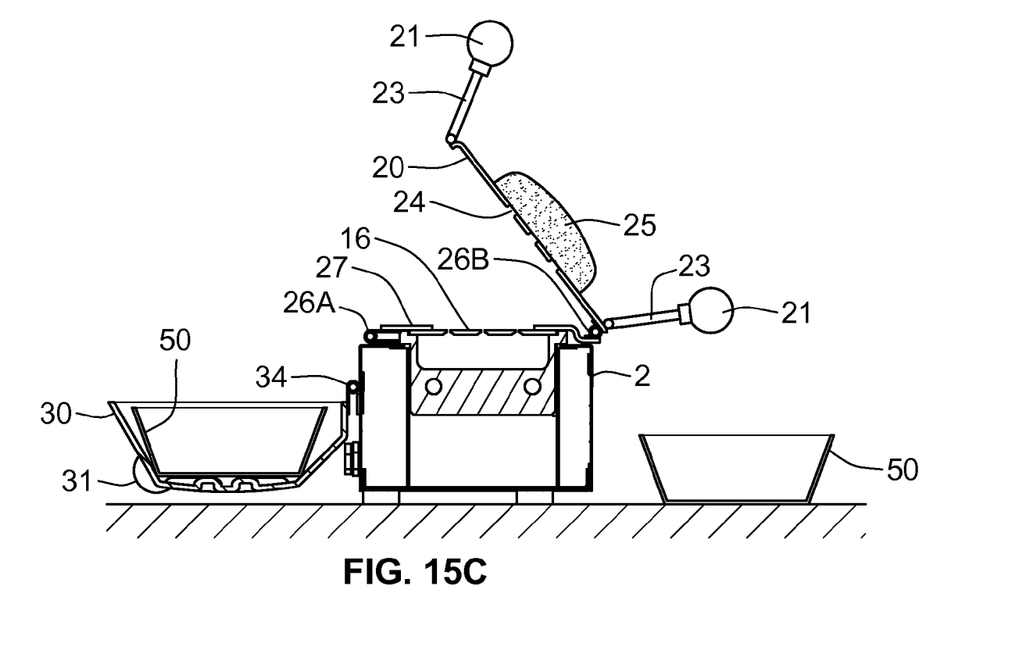
FIG. 15C is a cross-sectional front view of the embodiment shown in FIG. 15A with the food product platform shown in FIG. 15A, rotated clockwise.

FIG. 15A is an exploded view of another alternate embodiment of a steamer 10E Unlike the embodiments depicted in FIGS. 1-14, in FIGS. 15A-15C, the food product platform 20 can rotate in two directions by attaching the platform 20 to a double-acting hinge 60 assembly. A double-acting hinge is sometimes referred to as a "saloon-door hinge" in that a saloon door can swing in two directions. The double-acting hinge mechanism 60 shown in FIGS. 15A-15C permits the food support platform 20 to rotate away from the steam-emitting opening 14 of the base 2, in two directions.

The double-acting hinge 60 is comprised of two hinges 26A and 26B and a substantially rectangular, platform base plate 27. One "side" of a first hinge 26A is attached to the top surface 3 of the base 2 while the other "side" of the first hinge 26A is attached along one edge of the platform base plate 27, preferably to the bottom or underside of the platform base plate 27, not visible in the figure. One "side" of a second hinge 26B is attached to the platform base plate 27 along a second opposite edge of the platform base plate 27 as shown. The second "side" of the second hinge 26B is attached to the food product support platform 20, preferably to the bottom or underside of the food support platform 20.

As can be seen in FIG. 15A, the two hinges 26A and 26B are configured to allow the platform base plate 27 and the platform to rotate "away" from the steam-emitting opening 14, in opposite directions. As shown in FIGS. 15A and 15B, the first hinge 26A is connected between the base 2 and the platform base plate 27. The first hinge 26A allows the platform base plate 27, and anything attached to the platform base plate 27, to rotate "away" from the steam-emitting opening 14, in counterclockwise direction (when viewed from the front) around an axis of rotation defined by the first hinge 26A. Since the second hinge 26B is attached to the platform base plate 27, it will rotate counterclockwise with the platform base plate 27, around the first hinge 26A, as the platform base plate 27 is rotated "away" from the opening 14 in a counterclockwise direction.

As shown in FIG. 15C, when the platform base plate 27 is "down" and resting against the top 3 of the base 2, the second hinge 26B, which is attached to the platform base plate 27 along an edge opposite the first hinge 26A, allows the food product support platform 20 to rotate away from the opening 14 in a clockwise direction, leaving the platform base plate 27 against the top 3 of the base 2. The two hinges 26A and 26B and the platform base plate 27 thus comprise a double-acting hinge, which effectively allows the food product support platform 20 to rotate together with the platform base plate 27 in a first direction (counterclockwise in the figure) and to rotate without the platform base plate 27 in a second direction (clockwise in the figure).

It should be noted that the centers of the platform base plate 27 are open, providing large steam-passing openings or holes 29. Steam passes through the holes 29 in the platform base plate 27 and into the steam passing holes 24 formed in the food product support platform 20. The large openings 29 in the platform base plate 27 allow the steam to pass through the food product support platform 20 with minimal heat loss.

As with the other embodiments described above, a steam-trapping hood 30 is attached to one side of the base 2 by an elongated piano hinge 34. When the hood 30 is open, as shown in FIGS. 15B and 15C, food products on the platform 20 can be removed from the platform 20 by rotating the platform 20 in either clockwise or counterclockwise direction.

Those of ordinary skill in the art will recognize that while the second distance D2 is shown in various figures as being greater than the first separation distance D1 an alternate and equivalent embodiment includes using small, individual hinges instead of a piano hinge, which permit the attachment of the hood 30 to the same surface of the base 2 that the platforms 20 are attached to. The location of such hinges relative to the edge 15 of the opening 14 could therefore be a design choice, i.e., less than or equal to D1. Such embodiments would include attaching both hinges to the top side 3 of the base 2. In yet another alternate embodiment, both hinges 26 and 34 can be attached to the same side of the base such that D1 and D2 would be equal or substantially equal.

In each of the embodiments, the hood 30 is preferably a rigid plastic but can also be comprised of a flexible plastic sheet or even a water permeable membrane so long as the hood is able to enclose or substantially enclose a food product on the platform and retain steam that is generated in the base 2.

For the sake of completeness, those of ordinary skill will recognize that in order to remove the food product 25 from the platform 20, the hood 30 is first rotated around an axis defined by the hinge 34, from a first, closed position to a second open position. As shown in several figures, the hood 30 is depicted in a closed position when the angle between its lower edges 35 and the top 3 is zero or substantially equal to zero degrees. The fully open position is preferably when the angle between the edges 35 and the top 3 is parallel or nearly parallel to the top face 3 of the hood 2 such that the concave shape of the hood 30 will retain a food product 25, with or without a point-of-sale package 50 placed into the hood 30.

The foregoing description is for purposes of explanation and illustration. The true scope of the invention is defined by the appurtenant claims.

What is claimed is:

1. A food product steamer (steamer) comprising:
   a base comprised of a top side, first and second opposing side walls, first and second opposing end walls, and an opening in the top side through which steam can be emitted, the opening being located between the first and second opposing side walls and between the first and second opposing end walls;
   a food product platform (platform) comprised of a first hinge, which is attached to the base at a first distance away from the opening toward the first side wall, the first hinge rotating between an acute first angle and a larger second angle, the first and second angles being measured around a first geometric axis defined by said first hinge, wherein at the first angle, the platform supports a food product to receive steam from the opening;
   a steam-trapping hood (hood) comprised of a second hinge, which is attached to the base at a second distance away from the opening toward the second side wall, the second hinge rotating between an acute third angle and a larger fourth angle, the third and fourth angles being as measured around a second geometric axis defined by said second hinge, the first geometric axis and the second geometric axis being on opposite sides of the opening and substantially parallel to each other;
   wherein when said first hinge is rotated to the first acute angle and the second hinge is rotated to the third acute angle, the platform is over the opening and the hood substantially covers a food product on the platform, the direction of the first hinge's rotation relative to the second angle being opposite the direction of the second hinge's rotation to the fourth angle.

2. The steamer of claim 1, wherein the platform is perforated with a plurality of steam-passing holes.

3. The steamer of claim 1, wherein the second distance is equal to the first distance.

4. The steamer of claim 1, wherein the second distance is greater than the first distance.

5. The steamer of claim 1, wherein the first and second hinges are attached to the top side of the base on opposite sides of the opening.

6. The steamer of claim 1, wherein the first hinge is attached to the first side wall and wherein the second hinge is attached to the second side wall.

7. The steamer of claim 1 wherein the first hinge is attached to the top side of the base between the opening and first side wall and wherein the second hinge is attached to the second side wall of the base.

8. The food product steamer of claim 1, wherein the platform is configured such that, the first angle is substantially equal to zero degrees.

9. The steamer of claim 8, wherein the platform is configured such that, the second angle is greater than ninety degrees.

10. The steamer of claim 9, wherein the hood is configured such that, the third angle is substantially equal to the first angle.

11. The steamer of claim 10, wherein the hood is configured such that, the fourth angle is, greater than or equal to the second angle.

12. The steamer of claim 1, wherein the base is further comprised of a steam generator below the opening.

13. The steamer of claim 12, wherein the platform has a smooth surface such that a food product can slide off the platform as the second angle increases from zero degrees toward ninety degrees.

14. The steamer of claim 1, wherein the hood is a rigid plastic.

15. The steamer of claim 1, wherein the hood is a flexible plastic sheet.

16. The steamer of claim 1, wherein the hood is a water permeable membrane.

17. The steamer of claim 1, wherein at least part of the platform is concave and configured to at least partially enclose a food item to be steamed.

18. The steamer of claim 1, wherein the hood has an interior volume, sized and shaped to receive a point-of-sale package for a food item to be steamed.

\* \* \* \* \*